United States Patent Office 3,099,931
Patented Aug. 6, 1963

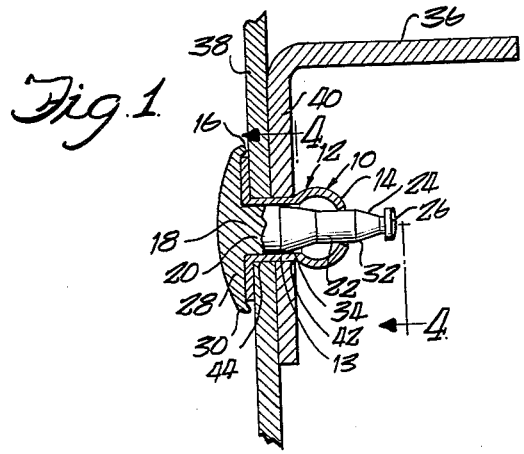
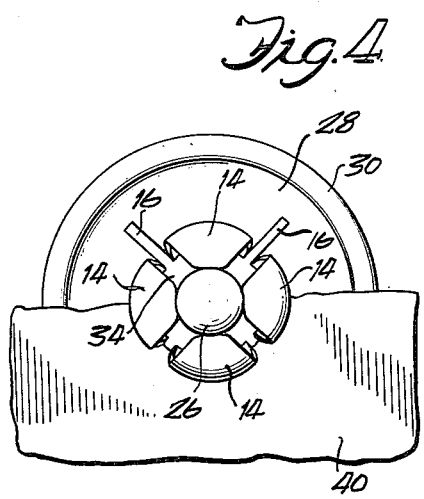
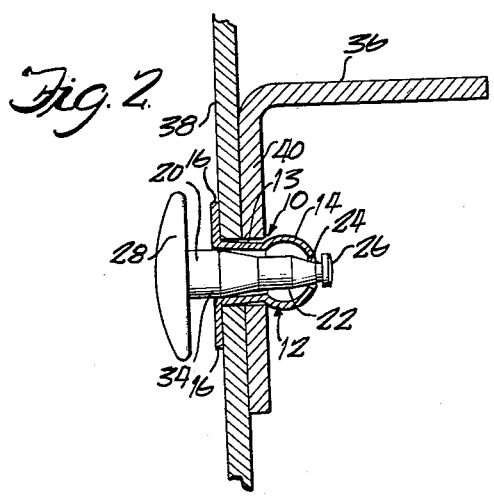
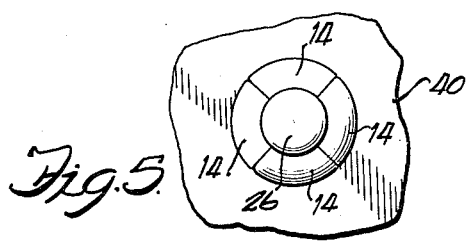
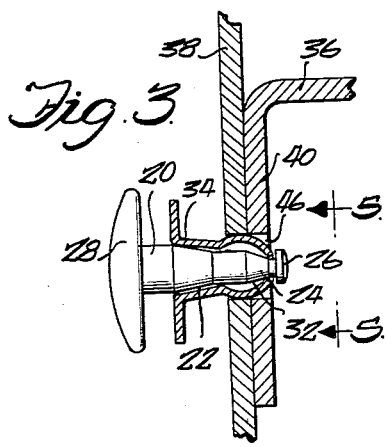
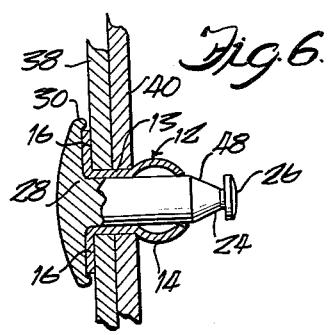

3,099,931
SHELF FASTENER ASSEMBLY
Irwin J. Ferdinand, Glencoe, Ill., assignor to S. A. Hirsh Manufacturing Company, Skokie, Ill., a corporation of Illinois
Filed Aug. 26, 1955, Ser. No. 530,667
3 Claims. (Cl. 85—40)

This invention relates to shelf fasteners, and more particularly to a fastener having a spring sleeve for releasably connecting a shelf to an upright support, and a pin slidably received in the sleeve for maintaining the sleeve in locking or release position as desired.

Although shelf fastener assemblies utilizing a pin have been available heretofore, it has been necessary either to maintain the shelf and support in permanently assembled condition, or to utilize the head of the pin to accomplish the expansion of the sleeve during fastening so that assembly is difficult and creates undesirable stress conditions.

It is accordingly an object of the present invention to provide a reusable unitary assembly of two simple parts, namely, a spring sleeve and pin, which is easily inserted to align openings in several members and draw them together without the necessity of undue pressure being applied.

Another object is to provide a pin and spring sleeve fastener assembly to secure several members together wherein the pin is operable from either end and from either side of the members from one or both sides.

Another object is to provide a spring fastener assembly whose resilient parts are not susceptible to shearing stress such as would cause damage or metal fatigue, so that the assembly can be used repeatedly.

Another object is to provide an assembly of the type indicated wherein bowed fingers are formed on the sleeve portion which are adapted to be held outwardly by the pin in its locking position so as to maintain the assembly against accidental removal.

Another object is to provide a stepped construction for the pin which permits ready constriction of the sleeve during removal so that resistance is reduced to a minimum.

Another object is to provide a bevelled configuration for the steps of the pin so that the sleeve can be easily cammed from release to locking position by axial movement of the pin.

Other objects and advantages of the invention will become apparent as the description proceeds with reference to the drawings in which:

FIG. 1 is a vertical sectional view of a shelf and shelf support frame held in assembled position by a shelf fastener assembly according to the present invention;

FIG. 2 is a view corresponding to the view of FIG. 1 and showing the pin portion of the shelf fastener in release position;

FIG. 3 is a view corresponding to the view of FIGS. 1 and 2 wherein the shelf fastener assembly is seen during removal;

FIG. 4 is an enlarged side elevational view partially broken away and taken along the line 4—4 of FIG. 1;

FIG. 5 is a side elevational view taken along the line 5—5 of FIG. 3; and

FIG. 6 is a vertical sectional view of a shelf and shelf support frame held in assembled condition by another embodiment of the fastener assembly of the invention.

Referring now to FIG. 1 the shelf fastener 10 of the invention comprises a spring sleeve 12 having a plurality of outwardly bowed fingers 14 at one end thereof and one or more flanges 16 at the other end turned outwardly at right angles to the sleeve portion 12. A pin 18 is slidably received in the sleeve 12 and includes a shank portion 20 adjacent one end thereof having a diameter substantially equal to the internal diameter of the sleeve 12, a shank portion 22 of reduced diameter relative to shank portion 20 and adapted to maintain fingers 14 under slight outward tension in the position shown and a groove 24 adjacent the other end of the pin 18 providing a shank portion of reduced diameter relative to intermediate shank portion 22. The pin 18 has a head 26 adjacent shank portion 24 whose diameter is of greater diameter than shank portion 24 and of less diameter than portion 20. A head 28 is formed integrally with shank portion 20 having a diameter substantially greater than shank portion 20 and preferably somewhat greater than the diameter defined by radial flanges 16, a peripheral flange 30 being preferably formed thereon.

The pin 18 thus has a stepped construction, and the various shank portions 22 and 24 and 20 and 22 are preferably connected by annular camming steps 32 and 34 respectively. Accordingly, upon axial movement of the pin 18 within the sleeve 12 the fingers 14 may be cammed over steps 32 from shank portion 24 to shank portion 22 without excessive resistance being encountered.

The shelf fastener assembly 10 is adapted to lock a shelf 36 upon a vertical support frame member 38, the shelf 36 having a depending flange for this purpose. Thus the shelf flange 40 and the upright support frame 38 are each provided with at least one aperture designated 42 and 44 respectively, each aperture having a diameter substantially the same as the external diameter of sleeve portion 12 and adapted to be aligned in mutual registration when the frame 38 and the flange 40 are assembled in approximate abutting relation.

When the fastener 10 is inserted in the apertures 42 and 44 as shown in FIG. 1, the sleeve portion 13 between the fingers 14 and the flanges 16 will have a length substantially the same as the combined thickness of frame support 38 and flange 40. The fingers 14 will be held outwardly by shank portion 22 under slight tension and cooperate with flanges 16 to oppose lateral movement of the frame 38 and flange 40. Accordingly, when a suitable number of fasteners 10 are secured in the frames 38 and flange 40 as described, the frame and flange will be held in tightly abutting relation and the shelf 36 will be securely positioned horizontally on the upright frame. It will be appreciated that maintaining the fingers 14 on shank portion 22 under the aforementioned slight tension as shown in FIGS. 1 and 4 tends to minimize the effect of shearing stress on the sleeve.

Referring now to FIG. 2, the assembly 10 is seen in its release position wherein the bowed fingers are in proximate relation to the shank portion 24. The fingers 14 are biased inwardly. Accordingly, when the pin 18 is in the position shown and is pushed through apertures 42 and 44 by manual pressure on head 28 or, alternatively, pulled therethrough by grasping the head 26, the widest portions of the fingers 14 will fit easily in the bore 46 formed by the apertures 42 and 44, as is seen most clearly in FIGS. 3 and 5. At the same time the head 26 will abut fingers 14 during removal to maintain the sleeve 12 in assembled relation with the pin 18. It is preferred that the lengths of shank portions 22 and 24 taken together approximate the length of sleeve 12, so that the constriction of the sleeve may be completely unobstructed by the pin, although this construction may be varied as circumstances may require.

In operation, assembly 10 may be inserted in the bore 46 formed in upright 38 and flange 40 by pushing head 28 manually with the fingers 14 in groove 24 and in abutting relation with head 26. When the fingers 14 have been passed through the bore 46, the flanges 16 will abut support frame 38 and further inward movement of the pin 18 will cause the sleeve 12 to ride upwardly on the cammed surface 34, after which the fingers 14 will ride up on cammed surface 32 so that they will be maintained in the locking position shown in FIG. 1. It will be seen that the pin need not be driven home completely to effect the desired locking action, which is advantageous where rapid assembly results in partial insertion of the pin.

When the pin 18 is completely inserted in the sleeve 12, the head 28 provides an effective covering for the flanges 16, but whenever fingers 14 are positioned upon shank portion 22, they will prevent accidental removal of the fastener. In disassembling the shelf 36 and frame 38 the head 26 will be pushed or head 28 pulled manually to cause the fingers 14 to move into proximate relation with shank portion 24 and against head 26. The assembly 10 may therefore be inserted or removed from either end and from either side of the shelf support 38 as may be most convenient.

Referring now to FIG. 6 another embodiment of the fastener assembly is shown wherein the shank portion 20 is extended so that it terminates immediately adjacent the reduced portion 24 in a stepped connection 48 corresponding to camming surface 32. The operation of the embodiment shown in FIG. 6 is substantially the same as the operation of the embodiment shown in FIGS. 1–5 but it will be appreciated that the simplified construction of the pin permits a reduced number of manufacturing operations, and has the further advantage that shank portion 20 affords a solid support against shearing action produced by flange 40 and support 38 even when the pin is partially inserted within sleeve 12.

A shelf fastener assembly has thus been provided which may be inserted or removed with a minimum of effort by virtue of the stepped construction of the pin which permits the bowed fingers 14 to be maintained in a release position within groove 24 while at the same time eliminating the effect of shearing stress as described when bowed fingers 14 are in their locking position on shank portion 22, in the first embodiment or on shank portion 20 in the embodiment of FIG. 6 so as to prevent accidental removal of the fastener. The provision of camming steps between the various shank portions of the pin also affords an easy transition between the locking and release positions thereof. Furthermore, the fact that the pin may be actuated from either end means that the shelf can be assembled or disassembled from the front by actuating head 26 where the frame 38 is against a wall, or from the back by actuating head 28 where materials are stacked on a next lower shelf for example, so that access from the front is difficult.

Thus, it will be seen how the unitary fastener may be easily assembled before or after shipment, or shipped in place on one of the members to be fastened and how insertion aligns the members to be fastened, draws them together and carries shear forces by solid metal. Moreover, it will be observed how the fastener can be used for applications for insertion and removal from one side as well as opposite sides if desired, and when the head is pulled out, the spring member goes with it.

Although I have shown a preferred embodiment of the invention together with another embodiment thereof, it will be apparent to those skilled in the art how the objects stated are accomplished along with the many advantages mentioned and how various other and further modifications or changes can be made without departing from the spirit of the invention, the scope of which is commensurate with the appended claims.

I claim:

1. A releasable fastener for use in securing together a pair of elements oriented in facing, contiguous relation and having aligned openings therethrough, comprising a sleeve equipped at one end with a flange defining shoulder and having a plurality of spring fingers extending approximately its full length and terminating in outward offset portions and inwardly directed free ends appreciably closing the end of said sleeve, said spring fingers flexing inwardly to permit insertion of said offset portions through the aligned openings to a position engaging the remote surface of the element remote from said flange when said shoulder abuts the near surface of the other element, and a pin having an elongated shank of substantially greater length than that of said sleeve and extending therethrough, said pin being axially movable relative to said sleeve and having a head defined by a groove at one end thereof passable through said sleeve to a point beyond said free ends to receive the free ends in said groove and having at the other end thereof an enlarged head impassable through the sleeve so that said sleeve is constrained on said pin for movement between the heads thereof, said shank having a cross section adjacent said enlarged head dimensioned to be snugly received within said sleeve when the enlarged head is in substantial abutment with said flange, said sleeve and pin being insertable and removable through such openings in gripping relationship so as to hold these two parts together when said free ends are located in said groove and said shank engaging and expanding said free ends to maintain and lock said offset portions in engagement with said remote surface when said enlarged head is moved into abutment with said flange.

2. The fastener of claim 1 in which the offset portions are resilient and are normally urged inwardly and the free ends are cam edges so that full insertion of the shank of said pin in said sleeve cams said free ends outwardly to lock said offset portions radially in place to engage such elements in a resilient fashion to tolerate variations of thickness of such elements.

3. A fastener comprising a spring sleeve having a flange defining a shoulder at one end and a plurality of axially extending spring fingers normally sloped toward free end portions disposed remote from said shoulder that are bowed outwardly and terminate in inwardly directed free ends, said spring fingers flexing inwardly to permit insertion of the bowed end portions through openings of a dimension substantially equal to the outside dimensions defined by the spring fingers when they are parallel, and a pin having an elongated shank of greater length than said fingers, said shank having a first portion whose external wall slidably engages said spring fingers for holding them parallel against inward movement, a reduced portion accommodating said free ends when said bowed end portions are moved through said openings, and a headed end portion received through said sleeve to a point beyond said free ends of a size engaging said free ends in abutting relationship when said spring fingers are flexed inwardly, and a camming portion between said first portion and said reduced portion to engage said free ends and flex said bowed end portions outwardly to force them to a major dimension greater than said openings.

References Cited in the file of this patent

UNITED STATES PATENTS

| | | |
|---|---|---|
| 1,826,705 | Carr | Oct. 13, 1931 |
| 1,912,795 | Rice et al. | June 6, 1933 |
| 2,121,524 | Kimbell | June 21, 1938 |
| 2,141,892 | Wilson | Dec. 27, 1938 |
| 2,161,464 | Gilbert | June 6, 1939 |
| 2,314,770 | Cogswell | Mar. 23, 1943 |
| 2,370,336 | Wallace | Feb. 27, 1945 |
| 2,621,800 | Neubauer | Dec. 16, 1952 |
| 2,737,406 | Brookbank | Mar. 6, 1956 |
| 2,741,938 | Johnson | Apr. 17, 1956 |
| 2,826,110 | Lemelson | Mar. 11, 1958 |